(12) United States Patent
Tonelli et al.

(10) Patent No.: US 7,659,231 B2
(45) Date of Patent: Feb. 9, 2010

(54) (PER) FLUOROPOLYETHER COMPOUNDS

(75) Inventors: Claudio Tonelli, Milan (IT); Antonio Russo, Milan (IT)

(73) Assignee: Solvay Solexis S.p.A., Milan (IT)

( * ) Notice: Subject to any disclaimer, the term of this patent is extended or adjusted under 35 U.S.C. 154(b) by 679 days.

(21) Appl. No.: 11/269,751

(22) Filed: Nov. 9, 2005

(65) Prior Publication Data

US 2006/0111251 A1 May 25, 2006

(30) Foreign Application Priority Data

Nov. 19, 2004 (IT) .......................... MI2004A2238

(51) Int. Cl.
C07C 317/22 (2006.01)
C07D 295/08 (2006.01)
C08F 8/30 (2006.01)
C10M 169/00 (2006.01)

(52) U.S. Cl. .................. 508/182; 508/244; 508/246

(58) Field of Classification Search ............... 508/182, 508/244, 264
See application file for complete search history.

(56) References Cited

U.S. PATENT DOCUMENTS

| 3,214,478 | A | 10/1965 | Milian, Jr. |
| 3,242,218 | A | 3/1966 | Miller |
| 3,665,041 | A | 5/1972 | Sianesi et al. |
| 3,715,378 | A | 2/1973 | Sianesi et al. |
| 3,810,874 | A | 5/1974 | Mitsch et al. |
| 4,523,039 | A | 6/1985 | Lagow et al. |
| 4,647,413 | A | 3/1987 | Savu |
| 4,681,693 | A | 7/1987 | Gavezotti et al. |
| 5,149,842 | A | 9/1992 | Sianesi et al. |
| 5,225,549 | A | 7/1993 | Dekura et al. |
| 5,258,110 | A | 11/1993 | Sianesi et al. |
| 5,326,910 | A | 11/1993 | Sianesi et al. |
| 2004/0202894 | A1 | 10/2004 | Liu et al. |

FOREIGN PATENT DOCUMENTS

| EP | 0 148 482 A2 | 7/1985 |
| EP | 0 239 123 A2 | 9/1987 |
| EP | 0 340 740 A2 | 11/1989 |
| EP | 0 597 369 B1 | 9/1998 |
| EP | 1 336 614 A1 | 8/2003 |
| EP | 1 479 753 A | 11/2004 |
| GB | 1104482 | 12/1968 |
| GB | 1226566 | 3/1971 |
| WO | 90/03357 A1 | 5/1990 |

OTHER PUBLICATIONS

Turri et al., "NMR of Perfluoropolyether Diols and Their Acetal Copolymers", Macromolecules, 28, 7271-7275, 1995.
Turri et al., "Molecular characterization and chain flexibility of linear polyacetals containing poly-perfluoro(oxymethylene- ranoxyethylene) macromers", Macromol. Chem. Phys., 198, 3215-3228, 1997.
Snyder, Jr., et al., "Development of Polyperfluoroalkylethers as High Temperature Lubricants and Hydraulic Fluids", ASLE Transactions 13 (3), 171-180, 1975.

Primary Examiner—Walter D Griffin
Assistant Examiner—Frank C Campanell
(74) Attorney, Agent, or Firm—Arent Fox LLP

(57) ABSTRACT

Compounds having the following formula:

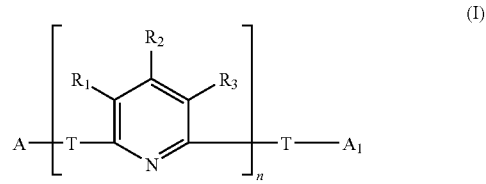

wherein:
A and $A_1$, equal or different, are respectively H or an aromatic end group as defined below; optionally said aromatic group being substituted;
n is an integer different from zero, such that the number average molecular weight of the compound of formula (I) is in the range 1,800-50,000,
T is the bivalent group —Y—$CH_2$—$CFW_1$—O—Rf—$CFW_2$—$CH_2$—Y—
wherein:
Y=O, S;
$W_1$ and $W_2$, equal or different, are F, $CF_3$;
Rf is a (per) fluoropolyoxyalkylene chain formed of one or more repeating units, statistically distributed along the chain; $R_1$, $R_2$, $R_3$, equal to or different from each other, are selected from H; linear or branched $C_1$-$C_8$ perfluoroalkyl, linear or branched $C_1$-$C_{15}$ (per) fluorooxyalkyl; linear or branched $C_1$-$C_8$ alkyl; linear or branched $C_1$-$C_8$a oxyalkyl, optionally containing one or more oxygen atoms; $NO_2$; CN.

19 Claims, No Drawings

(PER) FLUOROPOLYETHER COMPOUNDS

The present invention relates to fluorinated additives to be used as stabilizing agents to thermooxidation for fluorinated lubricating oils and greases. The products of the invention can also be used as fluorinated lubricating oils having a high thermooxidative stability.

More specifically the invention relates to oligomeric products having a (per)fluoropolyether structure containing pyridine rings in the polymeric backbone. The products according to the present invention can be used as oil and grease additives and also as lubricating oils self-stabilized at high temperature, higher than 200° C., generally higher than 230° C., preferably higher than 250° C., still more preferably higher than 300° C., and even up to 330° C., in oxidizing environment, optionally in the presence of metals. Furthermore the invention additives are obtainable with a process having very high yields, preferably higher than 90%.

It is known in the prior art that perfluoropolyethers have high thermal stability and are therefore used as lubricants, oils or greases, or as hydraulic fluids in many applications under severe working conditions, up to temperatures of about 200° C., in oxidative environment, optionally in the presence of metals. However perfluoropolyethers when used at temperatures higher than 200° C., for example 230°-250° C., do not show a high thermooxidative stability, until reaching the complete decomposition of the oil. The thermal decomposition process causes the breakage and fragmentation of the perfluoropoly-ether chains of the lubricating compound. In some cases the total decomposition of the perfluoropolyether fluid takes place. Under these conditions volatile fractions are formed, which evaporate, so that the lubricant is totally lost. Besides the lubricant decomposition is generally associated with a progressive metal corrosion in contact with the fluid.

It is known in the prior art that the resistance to oxidation of oils and greases having a perfluoropolyether structure, under very severe use conditions, for example at high temperatures, for example higher than 200° C., optionally in the presence of metals, can be improved by using specific stabilizing additives. We can cite, e.g., additives containing perfluoropolyether chains linked to arylphosphinic groups. See for example U.S. Pat. No. 4,681,693. These products have a good thermooxidative stability, however they have the drawback to be obtained with a process wherein very low temperatures, lower than −70° C., in anhydrous and inert environment, are used. Besides the yields are low.

Other additives described in the prior art contain perfluoropolyether chains linked to phosphotriazine groups. See for example U.S. Pat. No. 5,326,910. These products have a good thermooxidative stability. However the yields in said additives are low. Other additives described in the prior art contain perfluoropolyether chains linked to phosphazene groups (aryl substituted). See for example EP 597,369. These compounds have a good thermooxidative stability. Also in this case the yields in these additives are low, furthermore rather complex process conditions are used, as inert environment, flammable and volatile anhydrous solvents; furthermore sodium hydride is used.

As said, generally the thermooxidative stabilizing additives of the prior art are prepared by multistep processes. It is often necessary to prepare intermediate compounds by complicated syntheses and sometimes the intermediates isolated during the synthesis are toxic. Furthermore the yields are low. This represents a drawback from an industrial point of view. Besides, the starting compounds used in the synthesis of some additives described in the prior art, as for example the phosphazene precursor, are expensive compounds and represent an additional cost of the industrial process.

Besides, as regards in particular the perfluoropolyether compounds to be used as lubricating oils, it is known the difficulty to obtain by synthesis perfluoropolyether oils having a high molecular weight, therefore with a determined viscosity, as required in various applications. For example, by using the known synthesis methods it is not possible, generally, to obtain compounds having high molecular weights. It is therefore necessary to operate a distillation of the reaction raw product, obtaining compounds having number molecular weights of about 13,000. Therefore, in the prior art, to obtain high molecular weight oils, besides the synthesis process a further step is required as for example the distillation by column or by molecular still. Anyway the yield in the high molecular weight compounds is low.

The need was therefore felt to have available:

additives for perfluoropolyether oils or greases having a high capability to stabilize perfluoropolyether oils and greases in thermooxidative environment at temperatures higher than 200° C., generally higher than 230° C., preferably higher than 250° C., still more preferably higher than 300° C., and even up to 330° C., in oxidizing environment, optionally in the presence of metals;

lubricating oils having a high stability in thermooxidative environment at temperatures higher than 200° C., generally higher than 230° C., preferably higher than 250° C., still more preferably higher than 300° C., and even up to 330° C., in oxidizing environment, optionally in the presence of metals, so that they were usable without utilizing specific termooxidative additives;

said additives/oils being obtainable with a simple process, without the need to operate at very low temperatures, for example lower than −50° C., without using anhydrous solvents or particularly aggressive reactants as hydrides; said process being characterized by high yield, higher than 80%, preferably higher than 90%, using cheap and non toxic reactants; said process capable to give directly lubricating oils with the desired molecular weight, without the need of further separation processes, as for example distillation.

The Applicant has surprisingly and unexpectedly found products having (per)fluoropolyether structure which solve the above technical problem, i.e. usable as additives of perfluoropolyether oils or greases, or as oils per se, without the need to add thermooxidative stabilizers.

An object of the present invention are compounds having the following formula:

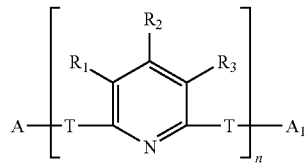

wherein:

A and $A_1$, equal or different, are respectively H or an aromatic end group; the latter optionally substituted with one or more substituents selected from H, linear o branched when possible $C_1$-$C_8$ (per)fluoroalkyl, linear or branched when possible $C_1$-$C_{15}$ (per)fluorooxyalkyl, optionally containing one or more oxygen atoms; $NO_2$; CN; OH; linear or branched $C_1$-$C_8$ alkyl; linear or branched $C_1$-$C_8$ oxyalkyl, optionally containing one or more oxygen atoms;

n is an integer higher than zero such that the number average molecular weight of the compound of formula (I) is in the range 1,800-50,000, preferably 3,000-30,000, more preferably 8,000-20,000;

T is a bivalent linking group $$-Y-CH_2-CFW_1-O-Rf-CFW_2-CH_2-Y-$$

wherein:

Y=O, S;

$W_1$ and $W_2$, equal or different, are F, $CF_3$;

Rf is a (per)fluoropolyoxyalkylene chain comprising one or more repating units, statistically distributed along the polymeric backbone, having the following structure:

(CFXO), ($C_2F_4O$), ($CF_2CF_2CF_2O$), ($CF_2CF_2CF_2CF_2O$), ($CR_5R_6CF_2CF_2O$), ($C_3F_6O$);

wherein X is F, $CF_3$; $R_5$ and $R_6$, equal to or different from each other, are selected from H, Cl, or perfluoroalkyl from 1 to 4 carbon atoms, said $R_f$ having a number average molecular weight between 500 and 10,000, preferably between 800 and 5,000;

$R_1$, $R_2$, $R_3$, equal to or different from each other, are selected from H; $NO_2$; CN; linear or branched when possible $C_1$-$C_8$, preferably $C_1$-$C_3$, perfluoroalkyl, optionally containing Cl and/or heteroatoms, for example oxygen.

With aromatic end group in A and/or $A_1$ in formula (I) it is meant a substituent formed of one or more aromatic rings, optionally containing heteroatoms for example N, O, S; monocyclic and polycyclic; preferably selected from $C_6$-$C_{14}$ monopolycyclic aromatic rings, monocyclic or bicyclic heterocyclic rings having 5, 6, 9 atoms, containing one or two heteroatoms selected from N, O, S. Examples of substituents which can be used as aromatic end groups are the following: benzene, biphenyl, naphthalene, anthracene, pyridine, thiophene, benzothiophene, quinoline, benzothiazole, quinoxaline, wherein in each of these substituents a free valence is present to form the bond with the bivalent group T of formula (I).

In Rf the repeating unit ($C_3F_6O$) of the (per)fluoropolyoxyalkylene chain can be:

$$(CF_2CF(CF_3)O)- \text{ or } -(CF(CF_3)CF_2O)-.$$

The preferred perfluoropolyether chain Rf is selected from the following structures:

$$(CF_2CF(CF_3)O)_a(CFXO)_b-CF_2(R'_f)CF_2-O-(CFXO)_b(CF_2CF(CF_3)O)_a- \quad (A)$$

wherein $R'_f$ is a fluoroalkylene group from 1 to 4 C atoms; X is as above; a and b are integers such that the number average molecular weight is within the above range; a/b is between 10 and 100;

$$-(CF_2CF_2O)_c(CF_2O)_d(CF_2(CF_2)_zO)_h- \quad (B)$$

wherein c, d and h are integers such that the number average molecular weight is within the above range; c/d is between 0.1 and 10; h/(c+d) is between 0 and 0.05, z is 2 or 3; h can also be equal to 0;

$$-(C_3F_6O)_e(CF_2CF_2O)_f(CFXO)_g- \quad (C)$$

wherein X is as above; e, f, g are integers such that the number average molecular weight is within the above range; e/(f+g) is between 0.1 and 10; f/g is between 2 and 10;

$$-(CF_2(CF_2)_zO)_s- \quad (D)$$

wherein s is an integer such as to give the molecular weight in the range indicated above, z has the meaning as above;

$$-(CR_5R_6CF_2CF_2O)_{p'}-R'_f-O-(CR_5R_6CF_2CF_2O)_{q'}- \quad (E)$$

wherein $R_5$ and $R_6$ are equal to or different from each other and selected from H, Cl or perfluoroalkyl from 1 to 4 C atoms; $R'_f$ is as above; p' and q' are integers such as to have a molecular weight in the range indicated above;

$$-(CF(CF_3)CF_2O)_{j''}-R'_f-O-(CF(CF_3)CF_2O)_{j''}- \quad (F)$$

j" being an integer such as to give the molecular weight indicated above, $R'_f$ being as above.

Particularly preferred structures are (A) and (B), more preferably (B).

The above described (per)fluoropolyoxyalkylene structures can be obtained by using the synthesis methods described in GB 1,104,482, U.S. Pat. No. 3,715,378, U.S. Pat. No. 3,242,218, U.S. Pat. No. 4,647,413, EP 148,482, U.S. Pat. No. 4,523,039, EP 340,740, WO 90/03357, U.S. Pat. No. 3,810,874, EP 239,123, U.S. Pat. No. 5,149,842, U.S. Pat. No. 5,258,110.

The compounds of the present invention are transparent and odourless viscous liquids.

As said, the compounds of the present invention can also be used as lubricating oils. It has been indeed surprisingly and unexpectedly found by the Applicant that the compounds of the present invention have a high thermal stability at temperatures higher than 200° C., generally higher than 230° C., preferably higher than 250° C., still more preferably higher than 300° C., and even up to 330° C., optionally in the presence of metals.

As said, the compounds of formula (I) can also be used as additives of fluorinated lubricants, oils and/or greases, to confer improved thermooxidative properties.

A further object of the present invention are lubricating compositions comprising:
an oil or a grease having a perfluoropolyether structure;
from 0.05% to 10% by weight, preferably from 0.1% to 5%, still more preferably from 0.5% to 2% by weight, on the total composition, of compounds of formula (I) of the present invention.

The perfluoropolyethers usable as oils or as a component for preparing greases are described hereinafter:

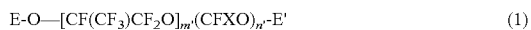  (1)

wherein:
X is as above;
E and E', equal to or different from each other, are selected from $-CF_3$, $-C_2F_5$ or $-C_3F_7$;
m' and n' are integers such that the m'/n' ratio is between 20 and 1000 and the viscosity of the oil at 20° C. is within the limits indicated below; the above indicated repeating units are statistically distributed along the chain.
These compounds can be obtained by perfluoropropene photooxidation as described in GB 1,104,432, and by subsequent conversion of the end groups as described in GB 1,226,566.

$$C_3F_7O-[CF(CF_3)CF_2O]_{o'}-D \quad (2)$$

wherein:
D is equal to $-C_2F_5$ or $-C_3F_7$;
o' is an integer such that the viscosity of the product is within the range indicated below.
These products can be prepared by ionic oligomerization of perfluoropropylenoxide and subsequent treatment with fluorine as described in U.S. Pat. No. 3,242,218.

$$\{C_3F_7O-[CF(CF_3)CF_2O]_{p'}-CF(CF_3)-\}_2 \quad (3)$$

wherein:
p' is an integer such that the viscosity of the product is in the range indicated below.
These products can be obtained by ionic telomerization of perfluoropropylenoxide and subsequent photochemical dimerization as reported in U.S. Pat. No. 3,214,478.

  (4)

wherein:
X is as above;
E and E', equal to or different from each other, are as above;
q', r' and s' are integers, 0 included, such that the viscosity of the product is in the range indicated below.
These products are obtainable by photooxidation of a mixture of $C_3F_6$ and $C_2F_4$ and subsequent treatment with fluorine as described in U.S. Pat. No. 3,665,041.

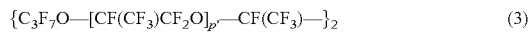  (5)

wherein:
E and E', equal to or different from each other, are as above;
t' and u' are integers such that the t'/u' ratio is between 0.1 and 5 and the viscosity of the product is in the range indicated below.
These products are obtained by photooxidation of $C_2F_4$ as reported in U.S. Pat. No. 3,715,378 and subsequent treatment with fluorine as described in U.S. Pat. No. 3,665,041.

  (6)

wherein:
E and E', equal to or different from each other are as above;
v' is a number such that the viscosity is in the range indicated below.

These products are obtained as reported in EP 148,482.

  (7)

wherein:
D and D', equal to or different from each other, are as above;
z' is an integer such that the viscosity of the product is in the range indicated below.
These products can be obtained as described in U.S. Pat. No. 4,523,039.

The perfluoropolyethers of the classes from (1) to (7) are liquids having a very low vapour pressure and have a kinematic viscosity measured at 20° C. generally from 10 to 10,000 cSt, preferably from 300 to 2,000 cSt.

The preferred perfluoropolyether oils are those of the classes (1), (4), (5) and are available on the market with the trademark FOMBLIN® marketed by Solvay Solexis.

The oils of formula (I) and the formulations of the invention, wherein the compounds of formula (I) are used as additives for fluorinated oils and greases, can contain other additives commonly used in the formulations of lubricants having a perfluoropolyether structure. For example anti-wear, anti-rust additives and Lewis anti-acid additives can be mentioned. For example usable anti-wear additives are those having a perfluoropolyether base linked to phosphazene rings, as for example those described in EP 1,336,614 in the name of the Applicant.

Furthermore, in case of fluorinated lubricating greases, the formulations contain one or more perfluoropolyether oils, belonging to one or more of the above classes, and thickening additives, preferably PTFE, optionally sodium terephthalate, calcium or lithium soaps, polyurea. Other components, generally contained in the greases, are the following: dispersing agents as for example surfactants, in particular nonionic surfactants and preferably with a perfluoropolyether or perfluoroalkyl structure; besides talc or inorganic fillers.

A further object of the present invention is a process for obtaining the compounds of formula (I), said process comprising the following steps:

a) Reaction of a compound of formula:

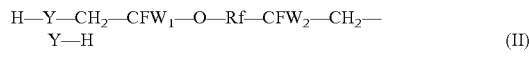  (II)

wherein Y, $W_1$, $W_2$, Rf are as above;

with a heterocyclic compound of formula:

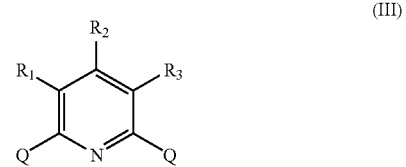  (III)

wherein:

Q=Cl, Br, Iodine, preferably Cl;

$R_1$, $R_2$, $R_3$ are as above;

in the presence of a base, at a temperature between 30° C. and 120° C., preferably between 60° C. and 100° C., optionally in the presence of an organic solvent inert under the reaction conditions;

b) washing of the organic phase with aqueous acids, phase separation, solvent removal, recovery of the reaction product formed of the compound of formula (I) wherein A and $A_1$ are H (compound IA);

c) optionally, introduction of one or two aromatic end groups, by reacting compound IA isolated in b) with a substituted mono-halogen aromatic compound, wherein halogen means Cl, Br, iodine, in the presence of a base, optionally by using an organic solvent inert under the reaction conditions; the temperatures used being the same as indicated in a);

d) the reaction mixture obtained in c) is washed with aqueous acids, the phases are separated and the optional organic solvent is removed, recovering the product of formula (I).

The compounds of formula (II) used in step a) are known in the prior art, for example they can be prepared as described in U.S. Pat. No. 3,810,874.

In step a) compound (II)/compound (III) molar ratio ranges from 1 to 2. Preferably the ratio in equivalents compound (II)/base is equal to 1.

Generally, the more the compound (II)/compound (III) molar ratio is near 1, the higher the molecular weight of the compound of formula (I).

In step a) the bases which can be used are inorganic bases, selected for example between KOH and NaOH, or organic bases as for example potassium terbutylate, aliphatic amines, as for example triethylamine.

The organic solvent optionally used in the process of the present invention is preferably selected from hydrogenated solvents, as for example terbutyl alcohol, acetonitrile, diglyme, DMF, toluene, xylene, or fluorinated or hydrofluorinated solvents, having boiling point between 20° C. and 150° C., preferably between 60° C. and 100° C.

The yields of compound (IA) obtained at the end of step b) are high and higher than 80%, preferably higher than 90%.

Generally in step a) and in step c) the reaction times are between 8 and 24 hours.

In step c), compound (IA)/substituted mono-halogen aromatic compound ratio by equivalent ranges from 2 to 1, preferably 1.

As said, the (per)fluoropolyether compounds of the present invention can be used as additives in compositions of oils and greases, and generally of perfluoropolyether-based lubricating fluids. They have the property of stabilizing perfluoropolyether oils and greases in thermooxidative environment even at use temperatures higher than 200° C., generally higher than 230° C., preferably higher than 250° C., still more preferably higher than 300° C., and even up to 330° C., also in the presence of metals. Besides, said additives show an extremely reduced vapour pressure, comparable or even lower than that of the perfluoropolyether lubricating oil. Therefore when the application conditions require high temperatures, even by operating under reduced pressures, no substantial loss of additive by evaporation is noticed. Therefore the lubricating formulation remains substantially unaltered assuring the performance in use for a long time.

As said, the compounds of the present invention can also be used as lubricating oils having a high thermal stability, therefore capable to be used at high temperatures, generally higher than 200° C. up to 330° C., in thermooxidative environment also in the presence of metals.

The invention compounds of formula (I), as above said, when used as lubricating oils have the advantage not to require the addition of specific stabilizing additives at thermooxidation. This is unexpected and surprising as for the lubricating oils of the prior art it is always required the addition of thermooxidative stabilizers when the oils are used at high temperatures in oxidative environment, for example in air.

Furthermore the compounds of the present invention are obtainable with a simple process, in high yields, as said higher than 80%, preferably higher than 90%, and which allows to prepare oils even having a high molecular weight, as required for many applications.

Tests carried out by the Applicant have shown that the compounds of the invention can also be used as antiwear additives for perfluoropolyether oils.

Furthermore tests carried out by the Applicant have shown that the compounds of the invention can also be used as additives or oils per se at high temperatures, higher than 200° C. up to 330° C., also in the presence of Lewis acids, without observing a significant oil decomposition.

Some examples are reported hereinafter for illustrative and not limitative purposes of the present invention.

EXAMPLES

Methods

The tests used to evaluate the effectiveness of the additives described in the present invention are briefly reported hereinafter:

Thermooxidation Test

The thermooxidation test has been carried out by using the equipment described by Carl E. Snyder, Jr. and Ronald E. Dolle, Jr., in ASLE Transactions, 13(3), 171-180 (1975). The used operating conditions were the following:

Test temperature: 270° C., except where otherwise indicated;

Air flow: 1 l/h;

Metals dipped in the fluid: stainless steel (AISI 304) and Ti alloy (Al 6%, V 4%).

A sample of the fluid to be tested, containing the additive excluding the comparative Examples carried out with the non additived fluid, is introduced in the glass test tube of the equipment (see for example FIG. 1 of the reference). It is weighed and heated at the test temperature. The required time elapsed, the glass test tube is cooled to room temperature and weighed again. The difference of weight before and after heating, referred to the weight of the sample before the test, gives the percent weight loss of the tested fluid. At the end of the test the state of the metals dipped into the fluid is visually evaluated.

Anti-Wear Test

The ASTM D 4172 method has been used as application test allowing to determine the wear as described hereinafter.

Three AISI N. E-52100 steel spheres, having a 12.7 mm diameter, 25 EP degree (Extra Polish), previously cleaned by washing by dipping in n-hexane (15 minutes) and then in Galden® HT55 (15 minutes) followed by drying, are placed in a container equipped with a suitable hollow so as to have three points in contact and, then, are covered with the lubricant to be tested. A fourth sphere of the same kind, connected to an electric motor which allows its rotation, is placed over the three mentioned spheres with a charge of 40±0.2 kgf (392 N). The whole is assembled, closed and heated to 75°±2° C. When said temperature has been reached, the fourth sphere, placed on the three of reference, is rotated at the rate of 1200±60 rpm for 60±1 minutes. At the end of the test the container is disassembled, the lubricant is removed and the wear of the three spheres contained therein is evaluated by an optical microscope having a 0.01 mm precision.

The wear value, expressed in mm, is obtained as an arithmetic average of six determinations, by measuring for each sphere, without removing it from the hollow, the wear diameter in the rotation direction and the diameter perpendicular thereto.

Determination of the Molecular Weight

The number average molecular weight is determined by $^{19}F$ NMR analysis according to S. Turri et al. Macromolecules, 1995, 28, 7271-7275 and S. Turri et al. Macromol. Chem. Phys. 198 3215-3228 (1997).

Viscosity Index Determination

The viscosity index is determined according to the ASTM D 2270 method determining the kinematic viscosities at 20° C., 40° C. and 100° C.

Example 1

Preparation of a (per)fluoropolyether derivative according to the present invention having number average molecular weight 7814 and containing in the chain a pyridine ring substituted with a nitro group and two methylol end groups, having the following formula about 4 hours, and then filtered on 0.2 μm PTFE filter. 27.7 g of product are obtained.

The IR and NMR ($^1H$, $^{19}F$ and $^{13}C$) analyses confirm the product structure indicated in the above formula.

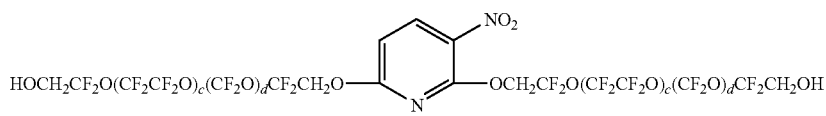

30 g of terbutyl alcohol and 1.75 g (0.0156 moles) of potassium terbutylate are introduced in a 250 ml glass reactor equipped with mechanical stirrer, thermometer and condenser.

30 g (0.0156 eq) of $HOCH_2CF_2O(CF_2CF_2O)_c(CF_2O)_dCF_2CH_2OH$ (EW=1923) wherein c/d=0.97 are then introduced at room temperature under stirring. The reaction mixture is left under stirring for about 30 minutes, then 0.75 g (0.0039 moles of 2,6-dichloro-3-nitropyridine are fed into the reactor. The so obtained mixture is heated to 80° C. and kept under stirring for about 6 hours. After cooling 100 g of a HCl aqueous solution at 5% by weight are added. The phases are then let separate and the organic phase which gathers on the bottom is recovered and washed twice with 100 g of demineralized water. After separation the organic phase is anhydrified by stripping at 120° C. at a residual pressure of $10^{-2}$ mbar for

Example 2

Preparation of a (per)fluoropolyether derivative having number average molecular weight 11,782, containing in the chain two pyridine rings each substituted with a nitro group and two methylol end groups, having the following formula 30 g of terbutyl alcohol and 1.75 g (0.0156 moles) of potassium terbutylate are introduced in a 250 ml glass reactor equipped with mechanical stirrer, thermometer and condenser.

Then 30 g (0.0156 eq) of $HOCH_2CF_2O(CF_2CF_2O)_c(CF_2O)_dCF_2CH_2OH$ (EW=1923) wherein c/d=0.97 are introduced at room temperature under stirring. The reaction mixture is left under stirring for about 30 minutes, then 1.0 g (0.0052 moles of 2,6-dichloro-3-nitropyridine are fed into the reactor. The so obtained mixture is heated to 80° C. and kept under stirring for about 6 hours. After cooling 100 g of a HCl aqueous solution at 5% by weight are added. The phases are then let separate and the heavy organic phase is recovered and washed twice with 100 g of demineralized water. After separation the organic phase is anhydrified by stripping at 120° C. at a residual pressure of $10^{-2}$ mbar for about 4 hours, and then filtered on 0.2 μm PTFE filter. 27.9 g of product are obtained.

The IR and NMR ($^1H$, $^{19}F$ and $^{13}C$) analyses confirm the average structure of the above product.

The thermogravimetric analysis has given the following results, expressed in loss per cent by weight:

nitrogen: 1%, 242° C.; 2%, 275° C.; 10%, 378° C.; 50%, 477° C.

Example 3

Preparation of a (per)fluoropolyether derivative having number average molecular weight 19,710 and containing in the chain four pyridine rings each substituted with a nitro group and two methylol chain end groups, having the following formula

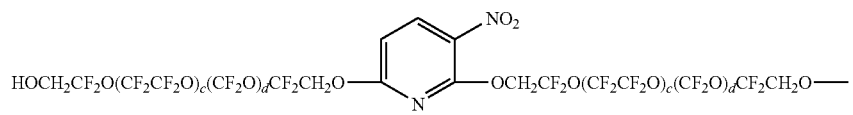

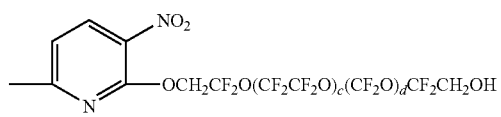

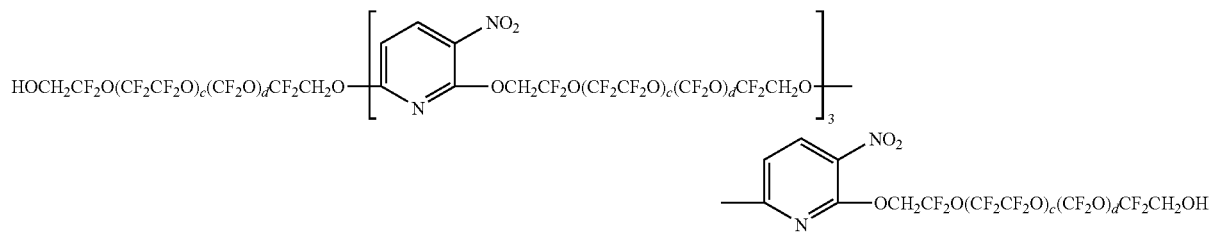

30 g of terbutyl alcohol and 1.75 g (0.0156 moles) of potassium terbutylate are introduced in a 250 ml glass reactor equipped with mechanical stirrer, thermometer and condenser.

Then 30 g (0.0156 eq) of $HOCH_2CF_2O(CF_2CF_2O)_c(CF_2O)_dCF_2CH_2OH$ (EW=1923) wherein c/d=0.97 are introduced at room temperature under stirring. The reaction mixture is left under stirring for about 30 minutes, and then 1.2 g (0.0062 moles of 2,6-dichloro-3-nitropyridine are fed into the reactor. The so obtained mixture is heated to 80° C. and kept under stirring for about 6 hours. After cooling 100 g of a HCl aqueous solution at 5% by weight are added. The phases are then let separate and the organic phase is recovered and washed twice with 100 g of demineralized water. After separation from the aqueous phase, the organic phase is anhydrified by stripping at 120° C. at a residual pressure of $10^{-2}$ mbar for about 4 hours, and then filtered on 0.2 μm PTFE filter. 27.5 g of product are obtained.

The IR and NMR ($^1H$, $^{19}F$ and $^{13}C$) analyses confirm the average structure of the above product.

The thermogravimetric analysis has given the following results, expressed in loss per cent by weight:

nitrogen: 1%, 245° C.; 2%, 275° C.; 10%, 378° C.; 50%, 469° C.

Example 4

Preparation of a (per)fluoropolyether derivative having number average molecular weight 8,146 and containing in the chain one pyridine ring substituted with a nitro group and at each end group one aromatic ring substituted with two nitro groups, having the following formula 30 g of terbutyl alcohol and 1.75 g (0.0156 moles) of potassium terbutylate are introduced in a 250 ml glass reactor equipped with mechanical stirrer, thermometer and condenser.

Then 30 g (0.0156 eq) of $HOCH_2CF_2O(CF_2CF_2O)_c(CF_2O)_dCF_2CH_2OH$ (EW=1923) wherein c/d=0.97 are introduced at room temperature under stirring. The reaction mixture is left under stirring for about 30 minutes, and then 0.75 g (0.0039 moles) of 2,6-dichloro-3-nitropyridine are fed into the reactor. The so obtained mixture is heated 80° C. and kept under stirring for about 3 hours. 1.58 g (0.0078 moles) of 1-chloro-2,4-dinitrobenzene are then added and it is left under stirring in temperature for further 3 h. It is cooled and 100 g of a HCl aqueous solution at 5% by weight are added. The phases are then let separate and the organic phase is recovered and washed twice with 100 g of demineralized water. After separation, the organic phase is anhydrified by stripping at 120° C. at a residual pressure of $10^{-2}$ mbar for about 4 hours, and then filtered on 0.2 μm PTFE filter. 29.7 g of product are obtained.

The IR and NMR ($^1H$, $^{19}F$ and $^{13}C$) analyses confirm the product structure having formula as above.

Example 5

Preparation of a (per)fluoropolyether derivative having number average molecular weight 8,953 and containing in the chain two pyridine rings each substituted with a nitro group and two methylol end groups, having the following formula

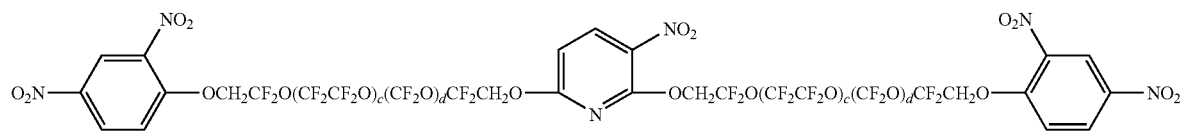

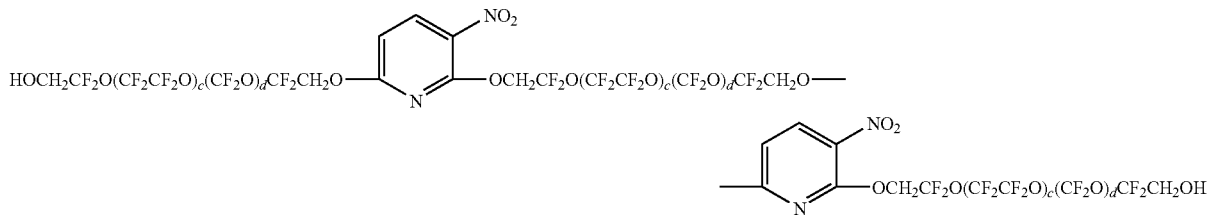

40 g of terbutyl alcohol and 2.29 g (0.0204 moles) of potassium terbutylate are introduced in a 250 ml glass reactor equipped with mechanical stirrer, thermometer and condenser.

Then 20 g (0.0204 eq) of $HOCH_2CF_2O(CF_2CF_2O)_c(CF_2O)_dCF_2CH_2OH$ (EW=980) wherein c/d=0.97 are introduced at room temperature under stirring. The reaction mixture is left under stirring for about 30 minutes, and then 1.4 g (0.0070 moles of 2,6-dichloro-3-nitropyridine are fed into the reactor. The so obtained mixture is heated to 80° C. and kept under stirring at this temperature for about 6 hours. It is cooled to room temperature and 100 g of a HCl aqueous solution at 5% by weight are added. The phases are then let separate and the organic phase is recovered and washed twice with 100 g of demineralized water. After separation, the organic phase is anhydrified by stripping at 120° C. at a residual pressure of $10^{-2}$ mbar for about 4 hours, and then filtered on 0.2 im PTFE filter. 19.3 g of product are obtained.

The IR and NMR ($^1H$, $^{19}F$ and $^{13}C$) analyses confirm the average structure of the above product.

The thermogravimetric analysis has given the following results expressed in loss percent by weight:

nitrogen: 10%, 269° C.; 50%, 455° C.

40 g of terbutyl alcohol and 2.95 g (0.026 moles) of potassium terbutylate are introduced in a 250 ml glass reactor equipped with mechanical stirrer, thermometer and condenser.

Then 50 g (0.026 eq) of $HOCH_2CF_2O(CF_2CF_2O)_c(CF_2O)_d CF_2CH_2OH$ (EW=1923) wherein c/d=0.97 are introduced at room temperature under stirring. The reaction mixture is left under stirring for about 30 minutes, and then 1.25 g (0.0065 moles of 2,6-dichloro-3-nitropyridine are fed into the reactor. The so obtained mixture is heated to 80° C. and kept under stirring at this temperature for about 3 hours. 2.3 g of 2-chloro-5(trifluoromethyl)pyridine (0.0128 moles) are then added and it is left at 80° C. under stirring for further 3 hours.

After cooling to room temperature 100 g of a HCl aqueous solution at 5% by weight are added. The phases are then let separate and the organic phase is recovered and washed twice with 100 g of demineralized water. After separation, the organic phase is anhydrified by stripping at 120° C. at a residual pressure of $10^{-2}$ mbar for about 4 hours, and then filtered on 0.2 μm PTFE filter. 46.0 g of product are obtained.

The IR and NMR ($^1H$, $^{19}F$ and $^{13}C$) analyses confirm the average structure of the above product.

Example 6

Preparation of a (per)fluoropolyether derivative having number average molecular weight 8,092, containing in the chain one pyridine ring substituted with a nitro group and with pyridine end groups having each one trifluoromethyl substituent, of the following structure formula:

Example 7

Preparation of a (per)fluoropolyether derivative having number average molecular weight 8,000, containing in the chain one pyridine ring substituted with a nitro group and with end groups formed of two benzothiazole groups, having the following structure formula:

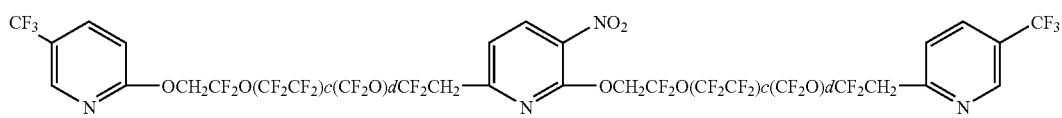

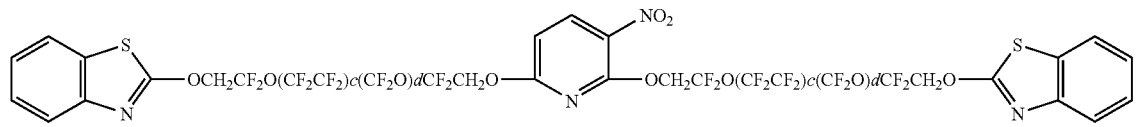

20 g of terbutyl alcohol and 1.17 g (0.0104 moles) of potassium terbutylate are introduced in a 250 ml glass reactor equipped with mechanical stirrer, thermometer and condenser.

Then 20 g (0.0104 eq) of $HOCH_2CF_2O(CF_2CF_2O)_c(CF_2O)_dCF_2CH_2OH$ (EW=1923) wherein c/d=1.0 are introduced at room temperature under stirring. The reaction mixture is left under stirring for about 30 minutes, and then 0.5 g (0.0026 moles of 2,6-dichloro-3-nitropyridine are fed into the reactor. The so obtained mixture is heated to 80° C. and kept under stirring at this temperature for about 3 hours. 1 g of 2-chlorobenzothiazole (0.0057 moles) is then added, it is left at 80° C. under stirring for further 3 hours. It is cooled to room temperature and 100 g of demineralized water are added, then it is neutralized with a HCl aqueous solution at 5% by weight. The phases are then let separate and the organic phase is recovered and washed twice with 100 g of demineralized water. After separation, the organic phase is anhydrified at 120° C. at a residual pressure of $10^{-2}$ mbar for about 4 hours, and then filtered on 0.2 μm PTFE filter. 19.6 g of product are obtained having a conversion of alcohol groups to ether groups of 98%.

The IR and NMR ($^1H$, $^{19}F$ and $^{13}C$) analyses confirm the structure of the above product.

Example 8

Use of the compound prepared in the Example 2 as additive to stabilize an oil at the thermooxidation A perfluoropolyether oil Fomblin®Z25 is additioned with an amount equal to 1% (w/w) of the compound of the Example 2. On the additived oil the above thermooxidation test is carried out. After 250 h at 270° C. a weight loss of the additived lubricant equal to 1.4% by weight is determined. The metals dipped into the fluid during the test (stainless steel and Ti, Al, V alloy) did not show oxidation/attack signs; at the end of the test their aspect was comparable with that of the specimens of the same metals not subjected to the treatment.

Stability to Lewis Acids

A perfluoropolyether oil Fomblin®Z25 is additioned with an amount equal to 1% (w/w) of the above prepared compound. On the additived oil the stability test to Lewis acids is carried out according to the method described hereinafter.

5 grams of the composition oil+additive together with 0.1 g of $AlF_3$ are fed into a glass test tube (about 10 cc). The test tube is weighed and closed with a screw plug having a hole in the middle on which a 30 cm PTFE little pipe is fixed which conveys possible decomposition products in a NaOH solution (0,1 N), contained in a gathering cylinder. The test tube is weighed and then heated at 250° C. for 24 hours. At the end the test tube is cooled and weighed again.

The weight loss, calculated as difference of the sample weight before and after heating, referred to the sample weight before heating, is equal to 0.65% by weight.

The stability test to Lewis acids is repeated on a sample of non additived perfluoropolyether oil Fomblin®25. At the end of the test a weight loss of 100% is noticed.

Example 9

Comparative

The thermooxidation test was repeated on the oil as such, without additive. After 250 h the complete oil loss took place (weight loss=100%). The metals dipped into the fluid during the test show at the end marked corrosion signs.

Example 10

The Example 8 was repeated but at 300° C. for 24 hours. It has been found that the weight loss is of 2.0%.

This result shows that the additives of the present invention effectively protect the oil even in particularly severe conditions, also in the presence of particularly high temperature peaks. The metals dipped into the fluid during the test (inox steel and Ti, Al, V alloy) did not show oxidation/attack signs; at the end of the test their aspect was comparable with that of the specimens of the same metals not subjected to the treatment.

Example 11

Stability at the thermooxidation of a perfluoro polyether derivative according to the present invention.

The compound synthesized in the Example 2 is subjected to the above described thermooxidation test. After 250 h at 270° C. a weight loss of the compound of 1.0% by weight is noticed.

Example 12

Use of the compound prepared in the Example 7 as additive to confer anti-wear properties to an oil.

A perfluoropolyether oil Fomblin®Z25 is additioned with an amount equal to 1% (w/w) of the compound of the Example 7.

A wear value equal to 1.16 mm is determined.

Example 13

Comparative

The Example 12 is repeated but omitting the additive. In this case a wear value equal to 1.50 mm is determined.

Therefore the presence of the additive according to the present invention has allowed to reduce the wear value of about 23%.

Example 14

Viscosity Measurements

The products obtained in the Examples 2, 3 were characterized as regards the viscosity at three different temperatures: 20°, 40° and 100° C., and compared with a perfluoropolyether oil Fomblin®M60.

The results are summarized in the following Table

| Ex. | Molecular weight | Viscosity (cSt) 20° C. | 40° C. | 100° C. | Viscosity Index |
|---|---|---|---|---|---|
| Ex. 2 | 11,783 | 651.3 | 267.0 | 53.8 | 265 |
| Ex. 3 | 19,710 | 655.6 | 273.7 | 55.2 | 266 |
| Fomblin ®M60 | 12,500 | 550 | 310 | 118 | 343 |

The above reported values confirm a range suitable with what required by the typical applications of fluorinated oils having a perfluoropolyether structure. In particular the high viscosity index values confirm the high viscostaticity of these oils, whose lubricating properties substantially remain scarcely varied and good in a wide range of temperatures.

Example 15

Use of the compound prepared in the Example 6 as additive to stabilize an oil at the thermooxidation A perfluoropolyether oil Fomblin®Z25 is additived with an amount equal to 1% (w/w) of the compound of the Example 6. On the additived oil the above described thermooxidation test is carried out. After 250 h at 270° C. a weight loss of the additived lubricant equal to 1.3% by weight is determined. The metals dipped into the fluid during the test (stainless steel and Ti, Al, V alloy) did not show oxidation/attack signs; at the end of the test their aspect was comparable with that of the specimens of the same metals not subjected to the treatment.

The invention claimed is:

1. Compounds having formula:

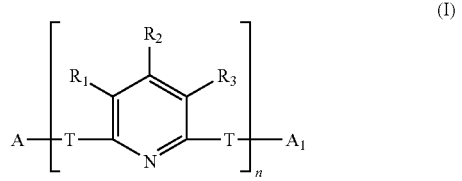

(I)

wherein A and $A_1$, equal or different, are respectively H or an aromatic end group; optionally said aromatic group being substituted with one or more substituents selected from the group consisting of H; linear or branched $C_1$-$C_8$ (per) fluoroalkyl; linear or branched $C_1$-$C_{15}$ (per) fluorooxyalkyl optionally containing one or more oxygen atoms; $NO_2$; CN; OH; and linear or branched $C_1$-$C_8$ alkyl; linear or branched $C_1$-$C_8$ oxyalkyl, optionally containing one or more oxygen atoms; n is an integer, higher than zero, such that the number average molecular weight of the compound of formula (I) is in the range 1,800-50,000; T is a bivalent group —Y—$CH_2$—$CFW_1$—O—$R_f$—$CFW_2$—$CH_2$—Y— wherein:

Y=O or S;

$W_1$ and $W_2$, equal or different, are F or $CF_3$;

$R_f$ is a (per) fluoropolyoxyalkylene chain comprising one or more repeating units, statistically distributed along the polymeric backbone, having one or more of the following structures:

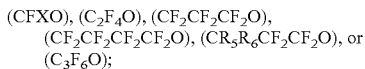

wherein X is F or $CF_3$; $R_5$ and $R_6$, equal to or different from each other, are selected from the group consisting of H, Cl, and perfluoroalkyl from 1 to 4 carbon atoms, said $R_f$ having a number average molecular weight between 500 and 10,000;

$R_1$, $R_2$, $R_3$, equal to or different from each other, are selected from the group consisting of H; $NO_2$; CN; linear or branched $C_1$-$C_8$ and perfluoroalkyl, optionally containing chlorine and/or heteroatoms.

2. Compounds according to claim 1, wherein the aromatic end group in A and/or $A_1$ in formula (I) is a substituent formed of one or more aromatic rings, optionally containing one or more heteroatoms selected from the group consisting of N, O, S, said rings being monocyclic or polycyclic.

3. Compounds according to claim 2, wherein the substituents used as aromatic end groups are selected from the group consisting of benzene, biphenyl, naphthalene, anthracene, pyridine, thiophene, benzothiophene, quinoline, benzothiazole, and quinoxaline, wherein in each of these substituents a free valence is present to form the bond with the group T in formula (I).

4. Compounds according to claim 1, wherein the repeating unit ($C_3F_6O$) of the (per) fluoropolyoxyalkylene chain $R_f$ is an unit of formula:

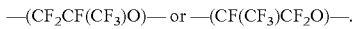

5. Compounds according claim 1, wherein the perfluoropolyether chain $R_f$ is selected from the following structures:

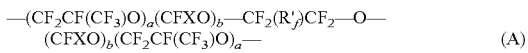
(A)

wherein $R'_f$ is a fluoroalkylene group from 1 to 4 C atoms; X is as recited in claim 1; a and b are integers such that the number average molecular weight is within the range recited in claim 1; a/b is between 10 and 100;

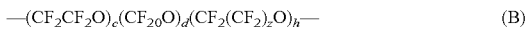
(B)

wherein c, d and h are integers such that the number average molecular weight is within the range recited in claim 1; c/d is between 0.1 and 10; h/(c+d) is between 0 and 0.05, z is 2 or 3; h can also be equal to 0;

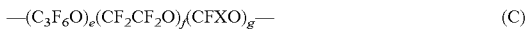
(C)

wherein X is as recited in claim 1; e, f, g are integers such that the number average molecular weight is within the range recited in claim 1; e/(f+g) is between 0.1 and 10; f/g is between 2 and 10;

$$—(CF_2(CF_2)_zO)_s—  \quad (D)$$

wherein s is an integer such as to give the number average molecular weight range recited in claim 1, z has the meaning as above;

$$—(CR_5R_6CF_2CF_2O)_{p'},—R'_f—O—(CR_5R_6CF_2CF_2O)_{q'}—  \quad (E)$$

wherein $R_5$ and $R_6$ are equal to or different from each other and selected from the group consisting H, Cl and perfluoroalkyl from 1 to 4 C atoms; $R'_f$ is as above; p' and q' are integers such as to have a number average molecular weight in the range recited in claim 1; and $$—(CF(CF_3)CF_2O)_{j''}—R'_f—O—(CF(CF_3)CF_2O)_{j''}—  \quad (F)$$

wherein j" is an integer such as to give the number average molecular weight range recited in claim 1 and $R'_f$ is as above.

6. Compounds according to claim 5, wherein $R_f$ is selected between (A) and (B).

7. Lubricating compositions comprising:
an oil or a grease having a perfluoropolyether structure;
from 0.05% to 10% by weight based on the weight of the lubricating composition, of compounds of formula (I) of claim 1.

8. Compositions according to claim 7, wherein the perfluoropolyether is selected from the following classes:

$$E-O—[CF(CF_3)CF_2O]_{m'}(CFXO)_{n'}-E'  \quad (1)$$

wherein:
X is as recited in claim 1;
E and E', equal to or different from each other, are selected from the group consisting of —$CF_3$, —$C_2F_5$ and —$C_3F_7$;
m' and n' are integers such that the m'/n' ratio is between 20 and 1,000 and the oil viscosity at 20° C. is in the range indicated below; the above mentioned repeating units are statistically distributed along the chain;

$$C_3F_7O—[CF(CF_3)CF_2O]_{o'}—D  \quad (2)$$

wherein:
D is equal to —$C_2F_5$ or —$C_3F_7$;
o' is an integer such that the product viscosity is in the range indicated below;

$$\{C_3F_7O—[CF(CF_3)CF_2O]_{p'}—CF(CF_3)—\}_2  \quad (3)$$

wherein:
p' is an integer such that the product viscosity is within the range indicated below;

$$E-O—[CF(CF_3)CF_2O]_{q'}(C_2F_4O)_{r'}—(CFX)_{s'}-E'  \quad (4)$$

wherein:
X is as recited in claim 1;
E and E', equal to or different from each other, are as above;
q', r' and s' are integers, 0 included, such that the product viscosity is within the range indicated below;

$$E-O—(C_2F_4O)_{t'}(CF_2O)_{u'}-E'  \quad (5)$$

wherein:
E and E', equal to or different from each other, are as above;
t' and u' are integers such that the t'/u' ratio is between 0.1 and 5 and the product viscosity is within the range indicated below;

$$E-O—(CF_2CF_2CF_2O)_{v'}-E'  \quad (6)$$

wherein:
E and E', equal to or different from each other are as above;
v' is a number such that the viscosity is within the range indicated below;

$$D-O—(CF_2CF_2O)_{z'}-D'  \quad (7)$$

wherein:
D and D', equal to or different from each other, are as above;
z' is an integer such that the product viscosity is within the range indicated below;
the kinematic viscosity measured at 20° C. being between 10 and 10,000 cSt.

9. Compositions according to claim 8, wherein the perfluoropolyether selected from the classes (1), (4) and (5).

10. Compositions according to claim 7, comprising anti-wear additives.

11. Compositions according to claim 7, wherein the oil or grease contains one or more perfluoropolyethers and thickening additives.

12. Compositions according to claim 11, comprising dispersing agents selected from the group consisting of surfactants, talc and inorganic fillers.

13. A process for obtaining the compounds of formula (I) according to claim 1, comprising the following steps:
a) Reaction of a compound of formula:

$$H—Y—CH_2—CFW_1—O—Rf—CFW_2—CH_2—Y—H  \quad (II)$$

wherein Y, $W_1$, $W_2$ and $R_f$ are as recited in claim 1;
with a heterocyclic compound of formula:

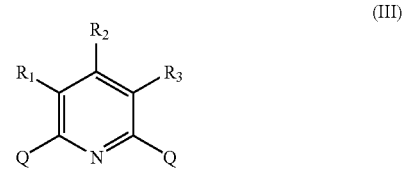

(III)

wherein:
Q=Cl, Br, or Iodine;
$R_1$, $R_2$, $R_3$ are as recited in claim 1;
in the presence of a base, at a temperature in the range 30° C.-120° C., optionally in the presence of a organic solvent inert under the reaction conditions;
b) washing of the organic phase with aqueous acids, phase separation, solvent removal, recovery of the reaction product formed of the compound of formula (I) wherein A and $A_1$ are H;
c) optionally introduction of one or two aromatic end groups, by reacting the compound isolated in b) with a substituted mono-halogen aromatic compound, wherein halogen has the meaning of Cl, Br, or iodine, in the presence of a base, optionally by using an organic solvent inert under the reaction conditions; the used reaction temperatures being the same indicated in a);
d) the reaction mixture obtained in c) is washed with aqueous acids, the phases are separated and the optional organic solvent is removed recovering the product of formula (I) wherein A and/or $A_1$ are an aromatic end group.

14. A process according to claim 13, wherein in step a) the molar ratio compound (II)/compound (III) ranges from 1 to 2; the ratio in equivalents compound (II)/base is equal to 1.

15. A process according to claim 13, wherein in step a) the used bases are inorganic bases or organic bases.

16. A process according to claim 13, wherein the optional organic solvent is selected from the group consisting of hydrogenated solvents, fluorinated solvents, and hydrofluorinated solvents having boiling point between 20° C. and 150° C.

17. A process according to claim 13, wherein in step c), the ratio in equivalents compound (IA)/substituted monohalogen aromatic compound ranges from 2 to 1.

18. A method of stabilizing lubricating compositions comprising an oil or a grease having a perfluoropolvether structure, said method comprising the step of:
  adding to the oil or grease from 0.05% to 10% by weight, the total composition, of compounds of formula (I) according to claim 1.

19. A method of lubricating a surface, comprising the step of applying the compounds according to claim 1, to the surface.

* * * * *